United States Patent Office 2,988,061
Patented June 13, 1961

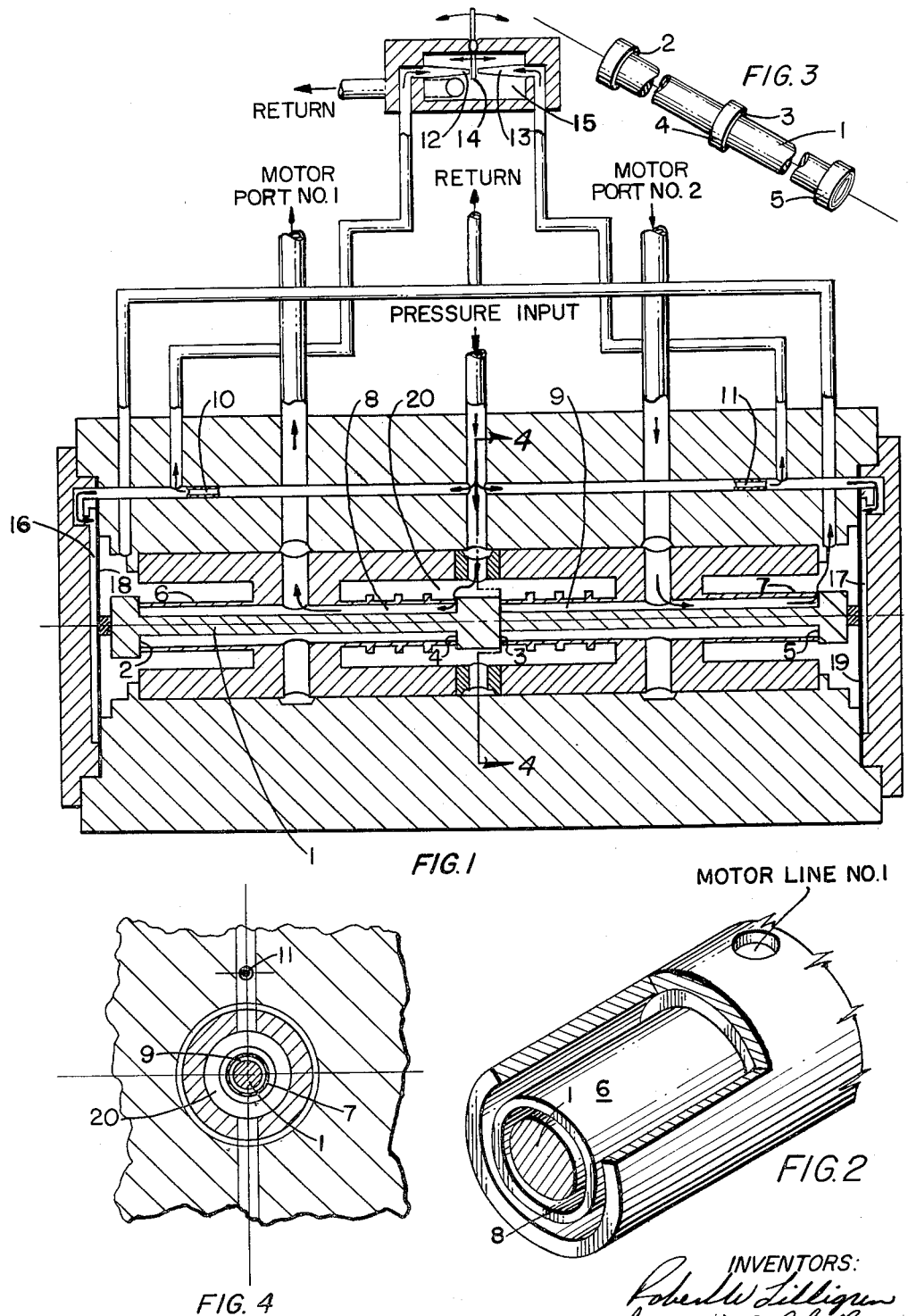

2,988,061
FOUR-WAY, REVERSIBLE FLOW, PROPORTIONAL SERVO VALVE
Franklin E. Shelly and Robert W. Lilligren, El Segundo, Calif., assignors to Shelly Associates, El Segundo, Calif., a corporation of California
Filed Nov. 25, 1957, Ser. No. 698,638
2 Claims. (Cl. 121—46.5)

The present invention relates to improvements in four-way servo valves in which fluid flow is taken from a source and furnished to one or more parts of a servo system in a predetermined amount and manner.

The four-way, reversible flow, proportional servo valve is used to control the direction and amount of fluid flow in the output of a servomechanism. Where fluid means is utilized to maintain a condition of equilibrium or stability, line of travel or set point, such a valve may be used. For example, in the servomechanism known as an automatic pilot, which maintaines a certain flight path for an aircraft, a gyroscope may be used to detect perturbation of the flight path from the desired path, the gyroscope transmitting, through an amplifier, an error signal to the servo valve, which in turn actuates flow in a hydraulic system in such a manner that a power cylinder contiguous with the elevators of the aircraft causes the error in flight path to be corrected. When there is no perturbation, the gyro transmits no error signal and the servo valve either remains at or returns to the neutral position, in which condition no fluid flow occurs in the elevator guidance actuators. The present invention may be used in precisely this manner, as well as in any other servo valve application normally encountered.

The objects of the instant improvements are:
(1) To provide in a servo valve a means of controlling the flow of fluid in such a manner as to eliminate sliding friction by elimination of sliding movements of the machine's components.
(2) To eliminate the requirement of dynamic seals which are customary in the construction of said machines which utilize sliding movements and thus exclude materials which passes small latitude as to maximum temperature tolerance.

One form of this invention is illustrated in the accompanying drawings; wherein, FIGURE 1 is a horizontal, longitudinal sectional view of the entire machine in the position in which the same may be operated.

FIGURE 2 is a longitudinal perspective view, partly cut away, taken along the exterior left extremity of cylinder 6, showing one end of the thin-walled compression cylinder integral with the thick-walled housing portion of that member showing the inner structure of the cylinder assembly.

FIGURE 3 is an illustration of the spool, showing bearing surfaces.

FIGURE 4 is a vertical, sectional view of the machine's central portion along the line 4—4.

The machine illustrated by the said drawings is a reversible-flow, proportional servo valve. In the neutral condition, the spool 1 is in such position that all four of its bearing surfaces 2, 3, 4, and 5 are closed against all four ends of the two thin-walled portions of the compression cylinders 6 and 7, thus permitting no fluid to pass into the inner chambers 8 and 9. Cylinders 6 and 7 are composed of a thick-walled, outside shell held rigidly in the body, and an integral thin-walled, compressible inner portion.

Fluid from a constant source enters the pressure input port and is then transmitted in three primary directions. In the first two lateral directions, the fluid passes through orifices 10 and 11 and is then transmitted in two secondary directions on each side; the first secondary direction is upward and through nozzles 12 and 13, in direct opposition against a force-operated flapper 14 which is contained in a flapper-nozzle chamber 15, thence out of the said chamber 15 through a return line to the source. The second secondary directions lead into opposed diaphragm chambers 16 and 17 which are located behind opposed diaphragms 18 and 19.

The third primary direction of fluid transmission is into the manifold chamber 20.

With pressure applied through the pressure input port during the neutral condition, the pressures behind the opposed diaphragms 18 and 19 are effectively equal. The pressures in motor No. 1 and motor No. 2 lines are equal. The spool 1 is in its central position, closed against the thin-walled ends of the compression cylinders 6 and 7, and no movement occurs in the external motor lines.

In operation, the force-actuated flapper 14 is moved to either right or left, closing the flow of fluid either through nozzle 12 or 13. In the right-hand operating position, nozzle 12 is closed, causing a pressure accumulation in diaphragm chamber 16 and thus diaphragm 18 moves to the right. This movement bears against the left end of spool 1, which, in turn, moves longitudinally from left to right and causes bearing surface 2 to exert a compressive force against the left end of the inner thin-walled portion of stationary compression cylinder 6, causing a reduction in the length of the compression cylinder 6 thin-walled left portion and allowing the spool bearing surface 4 to travel free of the compression cylinder 6 thin-walled right end; fluid enters the inner chamber 8 from the manifold chamber 20. From the inner chamber 8, the fluid is transported into the motor No. 1 line, thence externally to a motor which is actuated by the pressure differential. Return fluid from said motor is transported through motor No. 2 line to the inner chamber 9 of the right-hand thin-walled cylinder 7. The left-to-right movement of the spool 1 causes bearing surface 3 to reduce the length of the left end of thin-walled cylinder 7 and allows spool bearing surface 5 to travel free of the right end of cylinder 7, which, in turn, permits fluid entering inner chamber 9 to pass out through the return line.

Operation of the machine is reciprocal, i.e., a pressure increase on either side of the system causes a directly proportionate pressure decrease on the opposite side. Although the foregoing illustration and description has been devoted to the right hand position, the functions are alternate, in the exact and same manner, from right to left and vice-versa, thus affording a proportional reversal of flow.

Having thus fully described our invention, it is desired to claim and secure by Letters Patent of the United States as recited, to wit:

1. In a pressure-actuated, four-way reversible flow proportional servo valve for regulating the flow of a fluid, a rigid outer housing; a plurality of compressible thin-walled hollow cylinders rigidly confined in axial relationship within the housing; a spool contained within and between the thin-walled cylinders; enlarged diameters of said spool with shoulders adapted to bear against the ends of said fixed cylinders and to compressively shorten the length of the cylinders located between opposing pairs of said shoulders, allowing the ends of the cylinders opposite to the ends against which the spool bears to axially move free of the respective opposed shoulders and fluid flow to take place in the space thus afforded therebetween; means associated with the housing and cylinders to discharge the fluid flow from motor lines; opposed diaphragms at each extreme end of the spool to bear against said spool; chamber means behind said diaphragms to receive and direct fluid pressure against the diaphragms; porting and nozzle means joining the valve fluid system to the flapper mechanism; means associated with the spool and cylinders to reverse the direction of the fluid flow in the motor lines.

2. In a pressure-actuated, four-way reversible flow, proportional servo valve for regulating the flow of a fluid, a rigid outer housing; a plurality of compressible thin-walled hollow cylinders rigidly confined within a diameter of the housing in a segmentally-spaced axial inter-relationship; a continuous spool extending through the inner diameters of said thin-walled cylinders and occupying the spaces contiguously contained between distinctive segments of said thin-walled cylinders; enlarged diameters on the spool so spaced in relation to the thin-walled cylinders and the space contiguous thereto that each lateral shoulder of each such enlarged diameter bears upon the respective opposed end of the adjacent cylinder and is closely constrained thereto, effecting a fluid seal therewith; an inner circumferential chamber between the inner wall of each cylinder and the corresponding lesser diameter of the spool, each such chamber afforded an end fluid seal by means of the enlarged spool diameters; opposed actuating diaphragms disposed at the extreme ends of the spool to move the spool axially in relation to the thin-walled cylinders, so as to cause the shoulders of said spool to bear against alternate ends of said cylinders and to move free of constraint against respectively opposed alternate ends of said cylinders, enabling fluid contained in said inner circumferential chambers to flow between the spaces thus afforded and to discharge into motor lines connected thereto.

References Cited in the file of this patent

UNITED STATES PATENTS

| | | |
|---|---|---|
| 2,078,106 | Temple | Apr. 20, 1937 |
| 2,553,940 | Quartullo | May 22, 1951 |
| 2,831,554 | Reynolds | Apr. 22, 1958 |
| 2,835,265 | Brandstadter | May 20, 1958 |
| 2,836,154 | Lantz | May 27, 1958 |

FOREIGN PATENTS

| | | |
|---|---|---|
| 544,643 | Great Britain | Apr. 22, 1942 |